Figure 3:
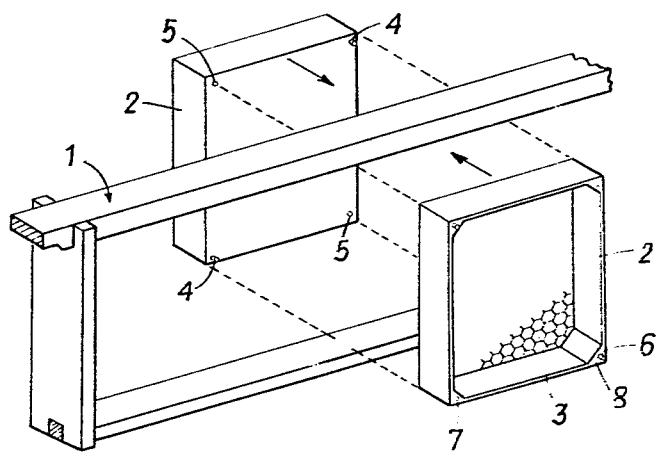

United States Patent

Krasnik

[11] 4,195,379
[45] Apr. 1, 1980

[54] DEVICE FOR COLLECTING HONEY AND COMB HONEY PACKAGE

[76] Inventor: Mätthaus Krasnik, Schiefling/See 131, Kärnten, Austria

[21] Appl. No.: 835,141

[22] Filed: Sep. 21, 1977

[51] Int. Cl.² .................. A01K 47/04; A01K 47/02
[52] U.S. Cl. ........................................................ 6/11
[58] Field of Search ................................ 6/1, 10, 11

[56] References Cited

U.S. PATENT DOCUMENTS

| 155,109 | 9/1874 | Robinson | 6/1 |
| 1,797,021 | 3/1931 | Reif | 6/10 X |
| 2,023,959 | 12/1935 | Knox | 6/10 |

Primary Examiner—Louis G. Mancene
Assistant Examiner—Robert P. Swiatek
Attorney, Agent, or Firm—Martin A. Farber

[57] ABSTRACT

The device comprises a box, which is open on one side and has on the other side a bottom, which is provided only on the inside with a honeycomb pattern. When it is desired to collect honey, at least one pair of these boxes are arranged with their bottoms facing and contacting each other. When comb honey has been collected in the boxes, a comb honey package is formed in that a pair of such boxes are assembled with their open sides facing each other.

10 Claims, 8 Drawing Figures

U.S. Patent  Apr. 1, 1980  Sheet 1 of 2  4,195,379
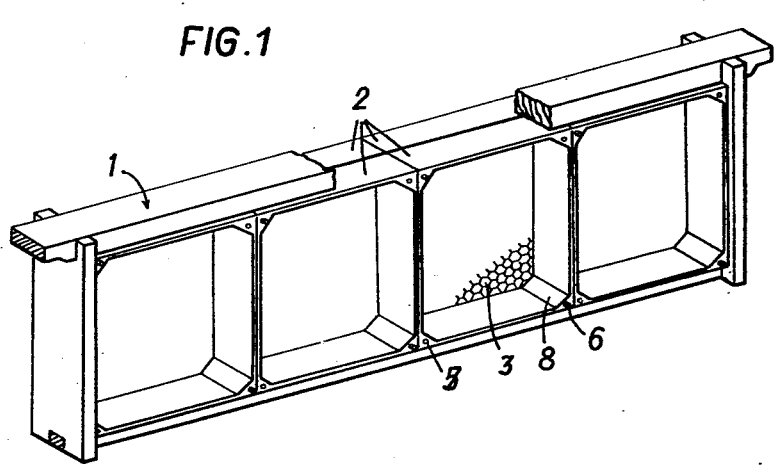
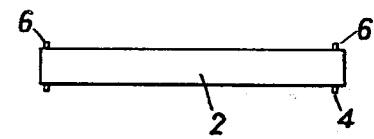
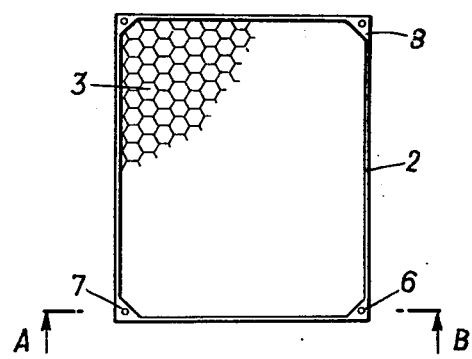

DEVICE FOR COLLECTING HONEY AND COMB HONEY PACKAGE

This invention relates to a device for recovering section comb honey.

Honey is being offered for sale almost exclusively as extracted honey, which can be recovered only when the honey is liquid so that it can be centrifuged. When the honey cannot be centrifuged from the combs, it can be sold as comb honey consisting of chunks of honeycomb. Whereas honey in that form is highly desirable, it is not offered for sale in substantial quantities because the recovery, packaging and handling of the comb chunks are too difficult for most beekeepers and for the trade. Besides, comb honey is hygienically satisfactory only when the comb cells have not been incubated.

For this reason it has been proposed in U.S. Pat. No. 3,187,353 and Austrian Pat. No. 69,003 to recover honey, mainly honey which cannot be centrifuged, in the form of comb honey in section frames. These are small frames which fit the honeycomb frame and are provided with very thin partitions of artificial material or only with partition strips of wax. The partitions may consist of beeswax or of a support which is covered with beeswax and may be provided on both sides with hexagonal projections for the attachment of cell walls. It has been found that the preparation of the small frames and of the partitions and the subsequent handling of chunks of comb comprising such frames is so complicated that these known devices have not become commercially accepted on a large scale.

For reasons which are not exactly known, melezitose-containing dew honey crops (or larch dew honey crops) have greatly increased in recent years, mainly in the Alpine region. In certain areas these crops are abundant and first-grade honey can be recovered from them. Because melezitose-containing honey becomes gelatinous or begins to crystallize two or three days after it has been collected by the bees and in that state can no longer be centrifuged, the recovery of comb honey is of great significance to beekeepers, who cannot recover that honey in the usual manner and cannot market it as extracted honey. It is known that many beekeepers try to avoid placing their beehives in regions in which melezitose-containing crops are available.

A great economic loss is suffered by beekeepers because the large quantities of melezitose-containing dew honey crops cannot be utilized. It is an object of the invention to provide a device which is of the kind described first hereinbefore and which is simple in structure and operation. The device is also desired to permit of an effective and inexpensive recovery of honey, mainly by beekeepers in Alpine forest regions.

This is accomplished according to the invention in that the device consists of a preferably quadrangular box, which is open on one side and has a bottom which constitutes a honeycomb attachment wall and is provided only inside the box with embossed extensions for the attachment of cell walls, which extensions are known per se on honeycomb center walls.

The device according to the invention is structurally simple and when filled with honey can be taken from the beehive and sold as a whole.

Further features of the invention are defined in subclaims.

Figure 4:
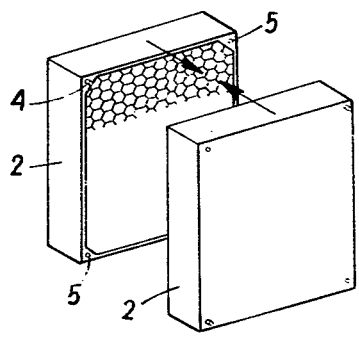
Figure 5:
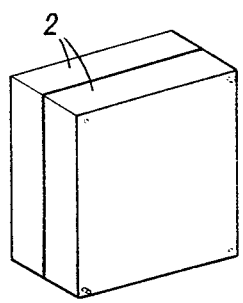
Figure 6:
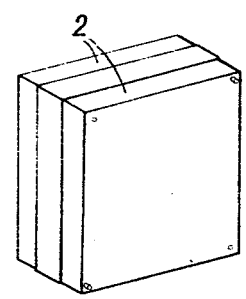

The invention will be explained more fully hereinafter with reference to the accompanying drawings, in which FIG. 1 shows a partly broken away perspective view of a honeycomb frame and boxes inserted therein, FIG. 2a is a sectional view taken on line A-B of FIG. 2c and showing a box, FIG. 2b is a side elevation showing said box, FIG. 2c is a top plan view of the box oriented as shown in FIG. 2a, FIG. 3 shows in perspective view a honeycomb frame partly broken away and boxes to be inserted into the same, and FIGS. 4 to 6 are perspective views of how the boxes are prepared for being dispatched and sold.

The device according to the invention is simple in structure and consists essentially of boxes 2, which are open on one side and have bottoms 3 which are embossed on the inside to form hexagonal ribs for the attachment of honeycomb cells.

As is apparent from FIGS. 3 and 1, the boxes according to the invention are inserted from both sides into empty honeycomb frames 1 in such a manner that the bottoms 3 abut each other. The boxes may be secured in the honeycomb frame 1 by retaining pins 4 and holes 5 with which the bottom 3 of each box 2 is provided. As a result, the bottoms contact each other. In the honeycomb frame 1, the bottom 3 in contact with each other form vertical walls, which divide the frame into two halves. Before the boxes 2 are used they are provided with a thin coating of beeswax, which is applied in a hot, liquid state. The resulting boxes are entirely acceptable to the bees regardless of the material of which the boxes are made. When the bees can collect honey, they soon form a very thin comb in each box, fill said comb with honey, and subsequently cover the cells of the comb with wax.

To recover the honey, the boxes which have been filled in the manner described hereinbefore are assembled in pairs of superimposed boxes having open sides facing each other, as is shown in FIG. 4. In the resulting package the pins 6 and holes 7 at the corners 8 of the boxes 2 interfit. This packaging operation requires only few manipulations and ensures that the honey and comb need not be touched with the hand. When the boxes 2 have been assembled, they are strapped with adhesive tape as shown in FIG. 6 to form an absolutely tight package which is ready for dispatch.

The boxes according to the invention are preferably made from a plastics material which is permissible for foodstuff packages and which can be shaped, e.g., by deep-drawing. Other materials, such as cellophane or the like may also be used.

What is claimed is:

1. A device for collecting honey, comprising
   at least one pair of integral one-piece boxes, each of which is open on one side and has on the other side an integral bottom,
   a honeycomb pattern integrally formed on said bottom only inside the boxes,
   means for arranging said boxes with said bottoms facing and contacting each other, said means comprising outwardly projecting pins alternating with axial holes and located adjacent the corners on said bottoms opposite said honeycomb pattern.

2. A device as set forth in claim 1, in which said pins and holes constitute detachably interfitting means holding said boxes in registry with each other.

3. A device as set forth in claim 1, which comprises a honeycomb frame in which said at least one pair of boxes are installed with said pins and holes of one box of a pair cooperatively engaging complementary holes and pins of the other box of said pair.

4. A device as set forth in claim 1, which comprises a honeycomb frame and
a plurality of said pairs of boxes installed in said honeycomb frame with said pins and holes of one box of a pair cooperatively engaging complementary holes and pins of the other box of said pair.

5. A device as set forth in claim 1, in which each of said boxes has top corners on said open side and is provided with axially outwardly projecting second pins and with second axial holes, with said second pins alternating with said second holes, said second pins of one of said boxes fit in said second holes of the other of said boxes, and said open sides of said boxes form a joint which is wrapped with adhesive tape.

6. A combination device for collecting section comb honey, and for subsequent direct use as a shipping package containing a honey-filled honeycomb, comprising at least one pair of boxes,
each of said boxes comprising an integral one-piece box having walls open on one side and having on the other side an integral bottom formed in one-piece with the walls,
a raised embossed honeycomb pattern being formed integrally on and only on one side of said bottom of said boxes on the inside of said boxes facing toward said open one side,
each box having top corners on said open one side, each box havng axially outwardly projecting pins and axial holes, respectively, adjacent said top corners, with said holes alternating with said pins,
said pins of one of said boxes of said pair of boxes are complementary to fit in said holes of the other box of said pair of boxes, with said pairs of boxes being assembleable with said open sides respectively facing each other after being filled with honey in the honeycomb pattern for direct immediate use as a shipping package.

7. A device as set forth in claim 6, in which each said box is rectangular.

8. A device as set forth in claim 6, in which said honeycombs have been formed in situ in said boxes and have been filled with honey in said boxes.

9. A device as set forth in claim 6, wherein
each of said boxes has bottom corners on said other side,
each of said boxes has axially outwardly projecting second pins and axial second holes, respectively, at diagonally opposite bottom corners, and
said second pins of one of said boxes of said pair of boxes are complementarily formed to fit in said second holes of the other box of said pair of boxes, with said pair of boxes assemblable with said bottom of each of said pair of boxes against each other prior to being filled with honey.

10. A device as set forth in claim 6, wherein
said open sides of each box of said pair of boxes form a joint when said pins are cooperatively inserted in said holes,
with adhesive tape being wrapped around said joint.

* * * * *